(12) United States Patent
Namikoshi et al.

(10) Patent No.: US 12,098,293 B2
(45) Date of Patent: Sep. 24, 2024

(54) RADIATION-CURABLE INK JET COMPOSITION, INK SET, AND METHOD FOR MANUFACTURING RECORDED MATERIAL

(71) Applicant: SEIKO EPSON CORPORATION, Tokyo (JP)

(72) Inventors: Shohei Namikoshi, Shiojiri (JP); Kyohei Tanaka, Sagamihara (JP)

(73) Assignee: SEIKO EPSON CORPORATION (JP)

( * ) Notice: Subject to any disclaimer, the term of this patent is extended or adjusted under 35 U.S.C. 154(b) by 236 days.

(21) Appl. No.: 17/881,694

(22) Filed: Aug. 5, 2022

(65) Prior Publication Data

US 2023/0051202 A1 Feb. 16, 2023

(30) Foreign Application Priority Data

Aug. 6, 2021 (JP) ................. 2021-129621

(51) Int. Cl.
| | |
|---|---|
| *C09D 11/322* | (2014.01) |
| *B41J 2/21* | (2006.01) |
| *B41M 5/00* | (2006.01) |
| *B41M 7/00* | (2006.01) |
| *C09D 11/037* | (2014.01) |
| *C09D 11/101* | (2014.01) |
| *C09D 11/40* | (2014.01) |

(52) U.S. Cl.
CPC .......... *C09D 11/322* (2013.01); *B41J 2/2117* (2013.01); *B41M 5/0023* (2013.01); *B41M 7/0081* (2013.01); *C09D 11/037* (2013.01); *C09D 11/101* (2013.01); *C09D 11/40* (2013.01)

(58) Field of Classification Search
CPC .... B41J 2/2117; C09D 11/101; C09D 11/322; C09D 11/38; C09D 11/40; C09D 11/037; B41M 5/0023; B41M 7/0081; C07D 311/08

See application file for complete search history.

(56) References Cited

U.S. PATENT DOCUMENTS

| | | | |
|---|---|---|---|
| 10,767,068 B2* | 9/2020 | Nakashima | .......... C09D 11/101 |
| 2003/0142168 A1 | 7/2003 | Suzuki et al. | |
| 2009/0171007 A1 | 7/2009 | Jonai et al. | |
| 2017/0252971 A1* | 9/2017 | Umebayashi | .......... C09D 11/40 |
| 2021/0024761 A1 | 1/2021 | Tanaka et al. | |

FOREIGN PATENT DOCUMENTS

| | | |
|---|---|---|
| CN | 101228240 A | 7/2008 |
| CN | 112300629 A | 2/2021 |
| JP | 2003-285427 A | 10/2003 |

* cited by examiner

*Primary Examiner* — Thinh H Nguyen
(74) *Attorney, Agent, or Firm* — Harness, Dickey & Pierce, P.L.C.

(57) ABSTRACT

A radiation-curable ink jet composition contains a polymerizable compound, a white pigment, and inorganic particles different from the white pigment. The polymerizable compound includes a monofunctional polymerizable compound. The content of the monofunctional polymerizable compound is 80 mass % or more with respect to the total mass of the polymerizable compound contained in the radiation-curable ink jet composition.

9 Claims, 1 Drawing Sheet

RADIATION-CURABLE INK JET COMPOSITION, INK SET, AND METHOD FOR MANUFACTURING RECORDED MATERIAL

The present application is based on, and claims priority from JP Application Serial Number 2021-129621, filed Aug. 6, 2021, the disclosure of which is hereby incorporated by reference herein in its entirety.

BACKGROUND

1. Technical Field

The present disclosure relates to a radiation-curable ink jet composition, an ink set, and a method for manufacturing a recorded material.

2. Related Art

An ink jet recording method enables a high-definition image to be recorded with a relatively simple device and has developed rapidly in various fields. For example, JP-A-2003-285427 describes an ink jet printer including a white head which ejects a white ink, process color heads each of which ejects ink of a corresponding one of process colors, and a control unit which selectively controls performing surface printing or reverse printing for a purpose of performing printing on a transparent or opaque packaging material depending on circumstances. Herein, reverse printing is printing on the underside of a packaging material for a purpose of providing durability against the abrasion of a printed surface or the like and is performed in such a manner that a transparent recording medium is used, an image is printed thereon with ink of a process color in advance, and thereafter, a background is printed with a white ink.

However, in the ink jet printer described in JP-A-2003-285427, there is a problem in that when recording is performed on a recording medium such as a non-absorbent recording medium or low-absorbent recording medium with a low ability to absorb ink, the adhesion of a coating film to the recording medium and the abrasion resistance thereof are insufficient.

SUMMARY

The present disclosure is a radiation-curable ink jet composition containing a polymerizable compound, a white pigment, and inorganic particles different from the white pigment. The polymerizable compound includes a monofunctional polymerizable compound and the content of the monofunctional polymerizable compound is 80 mass % or more with respect to the total mass of the polymerizable compound contained in the radiation-curable ink jet composition.

The present disclosure is an ink set including a non-white ink containing a non-white colorant and a polymerizable compound and a white ink. The white ink is the above radiation-curable ink jet composition.

The present disclosure is a method for manufacturing a recorded material using the above ink set. The method includes a first ejection step of ejecting the non-white ink to apply the non-white ink to a recording medium, a first curing step of irradiating the non-white ink applied to the recording medium with radiation to obtain a cured film of the non-white ink, a second ejection step of ejecting the white ink to apply the white ink to the cured film of the non-white ink, and a second curing step of irradiating the white ink applied to the recording medium with radiation to cure the white ink such that a recorded material is obtained.

DESCRIPTION OF EXEMPLARY EMBODIMENTS

An embodiment (hereinafter referred to as "this embodiment") of the present disclosure is described below in detail with reference to drawings. The present disclosure is not limited to this embodiment. Various modifications can be made without departing from the spirit of the present disclosure.

1. Recorded Material

Figure 2:
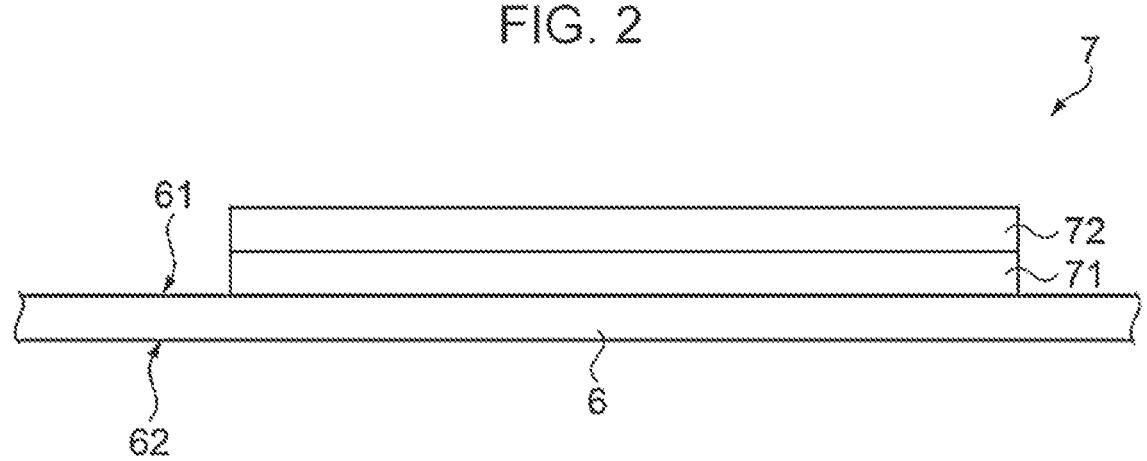
FIG. 2 is a schematic illustration of a recorded material in this embodiment.

Before a radiation-curable ink jet composition (hereinafter simply referred to as the "white ink" in some cases) of the present disclosure, an ink set thereof, and a method for manufacturing a recorded material are described, a recorded material manufactured using the ink set of the present disclosure is described with reference to FIG. 2.

A recorded material 7 includes a recording medium 6, a cured film 71 of a non-white ink that is disposed on a recording surface 61 of the recording medium 6, and a cured film 72 of the white ink. The recording medium 6 has a non-recording surface 62 provided with no non-white ink or white ink in addition to the above recording surface 61.

The white ink, which is described below in detail, contains a polymerizable compound, a white pigment, and inorganic particles different from the white pigment. The white ink contains a monofunctional polymerizable compound as a polymerizable compound and the content of the monofunctional polymerizable compound is 80 mass % or more with respect to the total mass of the polymerizable compound contained in the white ink.

Since the white ink contains the monofunctional polymerizable compound and the content of the monofunctional polymerizable compound is 80 mass % or more with respect to the total mass of the polymerizable compound contained in the white ink, the cured film 72 which is excellent in adhesion can be obtained. The white ink contains the white pigment and the inorganic particles, which are hard particles. This plays a role in protecting the cured film 72, thereby allowing the cured film 72 to have excellent abrasion resistance. That is, using the ink set of the present disclosure enables a recorded material which is excellent in adhesion and abrasion resistance to be obtained.

2. Radiation-Curable Ink Jet Composition

The white ink contains the polymerizable compound, the white pigment, and the inorganic particles, which are different from the white pigment. The white ink contains the monofunctional polymerizable compound as a polymerizable compound and the content of the monofunctional polymerizable compound is 80 mass % or more with respect to the total mass of the polymerizable compound contained in the white ink.

The term "radiation-curable ink jet composition" refers to ink that is cured by irradiation with radiation. Examples of radiation include ultraviolet rays, electron beams, infrared rays, visible rays, X-rays, and the like. Among these, radiation is preferably an ultraviolet ray from a viewpoint that a radiation source is readily available and is widely used and a viewpoint that material suitable for curing by irradiation with an ultraviolet ray is readily available and is widely used.

2.1. Polymerizable Compound

The white ink contains the monofunctional polymerizable compound and may contain a polyfunctional polymerizable compound, a polymerizable oligomer, and the like as required.

2.1.1. Monofunctional Polymerizable Compound

The content of the monofunctional polymerizable compound is 80 mass % or more with respect to the total mass of the polymerizable compound contained in the white ink, is preferably 85 mass % or more, and is more preferably 90 mass % or more. The content of the monofunctional polymerizable compound is preferably 99 mass % or less with respect to the total mass of the polymerizable compound contained in the white ink and more preferably 98 mass % or less. A fact that the content of the monofunctional polymerizable compound is 80 mass % or more allows the flexibility of the cured film 72 to be high. Therefore, the adhesion of the cured film 72 to the recording medium 6 further increases.

The monofunctional polymerizable compound is not particularly limited. Examples of the monofunctional polymerizable compound include an alicyclic group-containing monofunctional polymerizable compound, an aromatic group-containing monofunctional polymerizable compound, a nitrogen-containing heterocyclic group-containing monofunctional polymerizable compound, and the like. The monofunctional polymerizable compound used may be another monofunctional polymerizable compound other than the above monofunctional polymerizable compounds.

Using the monofunctional polymerizable compound enhances the flexibility of the cured film 72 and enables the recorded material 7 which has excellent adhesion to the recording medium 6 to be obtained.

2.1.1.1. Alicyclic Group-Containing Monofunctional Polymerizable Compounds

The alicyclic group-containing monofunctional polymerizable compound is not particularly limited. Examples of the alicyclic group-containing monofunctional polymerizable compound include alicyclic group-containing (meth)acrylates such as dicyclopentenyl (meth)acrylate, dicyclopentenyloxyethyl (meth)acrylate, dicyclopentanyl (meth)acrylate, 3,3,5-trimethylcyclohexyl (meth)acrylate, isobornyl (meth)acrylate, tert-butylcyclohexyl (meth)acrylate, 1,4-dioxaspiro[4,5]dec-2-ylmethyl 2-(meth)acrylate, and the like.

Among these, dicyclopentenyl (meth)acrylate (DCPA) and isobornyl (meth)acrylate (IBXA) are preferable. Using such a polymerizable compound enhances the adhesion and abrasion resistance of the cured film 72 that is obtained.

The content of the alicyclic group-containing monofunctional polymerizable compound is preferably 25 mass % to 55 mass % with respect to the total mass of the polymerizable compound contained in the white ink, more preferably 30 mass % to 50 mass %, and further more preferably 35 mass % to 45 mass %. A fact that the content of the alicyclic group-containing monofunctional polymerizable compound is in the above range further enhances the adhesion and abrasion resistance of the cured film 72 that is obtained.

2.1.1.2. Aromatic Group-Containing Monofunctional Polymerizable Compound

The aromatic group-containing monofunctional polymerizable compound is not particularly limited. Examples of the aromatic group-containing monofunctional polymerizable compound include phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumyl phenol EO-modified (meth)acrylate, 2-hydroxy-3-phenoxypropyl (meth)acrylate, and the like.

Among these, phenoxyethyl acrylate (PEA) is preferable. Using such an aromatic group-containing monofunctional polymerizable compound further enhances the solubility of a photopolymerization initiator and also further enhances the curability of the white ink. When an acylphosphine oxide photopolymerization initiator or a thioxanthone photopolymerization initiator is used, the solubility of a photopolymerization initiator is better.

The content of the aromatic group-containing monofunctional polymerizable compound is preferably 20 mass % to 50 mass % with respect to the total mass of the polymerizable compound contained in the white ink, more preferably 25 mass % to 45 mass %, and further more preferably 28 mass % to 40 mass %. A fact that the content of the aromatic group-containing monofunctional polymerizable compound is in the above range further enhances the adhesion and abrasion resistance of the cured film 72.

2.1.1.3 Nitrogen-Containing Heterocyclic Group-Containing Monofunctional Polymerizable Compound The nitrogen-containing heterocyclic group-containing monofunctional polymerizable compound is not particularly limited. Examples of the nitrogen-containing heterocyclic group-containing monofunctional polymerizable compound include nitrogen-containing monofunctional vinyl monomers such as N-vinylcaprolactam, N-vinylformamide, N-vinylcarbazole, N-vinylacetamide, vinylmethyloxazolidinone, and N-vinylpyrrolidone; nitrogen-containing monofunctional acrylate monomers such as acryloyl morpholine; nitrogen-containing monofunctional acrylamide monomers such as (meth)acrylamides including (meth)acrylamide, N-hydroxymethyl(meth)acrylamide, diacetone acrylamide, N,N-dimethyl(meth)acrylamide, and a dimethylaminoethyl acrylate benzyl chloride quaternary salt; and the like.

Among these, polymerizable compounds, such as N-vinylcaprolactam, N-vinylcarbazole, N-vinylpyrrolidone, vinylmethyloxazolidinone (VMOX), and acryloyl morpholine (ACMO), having a nitrogen-containing heterocyclic structure is preferable and acryloyl morpholine is more preferably contained. Using such a nitrogen-containing monofunctional polymerizable compound further enhances the abrasion resistance of the cured film 72. Furthermore, a nitrogen-containing monofunctional acrylate monomer, such as acryloyl morpholine, having a nitrogen-containing heterocyclic structure enhances the stretchability and adhesion of the cured film 72.

The content of the nitrogen-containing heterocyclic group-containing monofunctional polymerizable compound is preferably 10 mass % to 25 mass % with respect to the total mass of the polymerizable compound contained in the white ink, more preferably 12 mass % to 23 mass %, and further more preferably 15 mass % to 20 mass %. A fact that the content of the nitrogen-containing heterocyclic group-containing monofunctional polymerizable compound is in the above range further enhances the adhesion and abrasion resistance of the cured film 72.

2.1.2. Polyfunctional Polymerizable Compound

The polyfunctional polymerizable compound is not particularly limited. Examples of the polyfunctional polymerizable compound include a vinyl group-containing (meth) acrylate, a polyfunctional (meth)acrylate, and the like.

2.1.2.1. Vinyl Group-Containing (Meth)acrylate

The vinyl group-containing (meth)acrylate is not particularly limited and is, for example, a compound represented by the following formula:

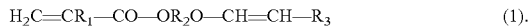
$$H_2C=CR_1-CO-OR_2O-CH=CH-R_3 \quad (1).$$

(In the formula, $R_1$ is a hydrogen atom or a methyl group, $R_2$ is a divalent organic residue containing two to 20 carbon atoms, and $R_3$ is a hydrogen atom or a monovalent organic residue containing one to 11 carbon atoms.)

In Formula (1), examples of the divalent organic residue, represented by $R_2$, containing two to 20 carbon atoms include linear, branched, or cyclic alkylene groups which contain two to 20 carbon atoms and which may be substituted; alkylene groups which contain an oxygen atom in an ether bond and/or an ester bond in a structure and two to 20 carbon atoms and which may be substituted; divalent aromatic groups which contain six to 11 carbon atoms and which may be substituted; and the like.

Among these, the following groups are preferable: alkylene groups, such as an ethylene group, an n-propylene group, an isopropylene group, and a butylene group, containing two to six carbon atoms and alkylene groups, such as an oxyethylene group, an oxy-n-propylene group, an oxyisopropylene group, and an oxybutylene group, containing an oxygen atom in an ether bond in a structure and two to nine carbon atoms. Furthermore, the following compound is more preferable from a viewpoint that ink can be reduced in viscosity and the curability of ink is made better: a compound containing a glycol ether chain in which $R_2$ is an alkylene group, such as an oxyethylene group, an oxy-n-propylene group, an oxyisopropylene group, or an oxybutylene group, containing an oxygen atom in an ether bond in a structure and two to nine carbon atoms.

In Formula (1), the monovalent organic residue, represented by $R_3$, containing one to 11 carbon atoms is preferably a linear, branched, or cyclic alkyl group which contains one to 10 carbon atoms and which may be substituted or an aromatic group which contains six to 11 carbon atoms and which may be substituted.

Among these, an alkyl group, such as a methyl group or am ethyl group, containing one or two carbon atoms or an aromatic group, such as a phenyl group or a benzyl group, containing six to eight carbon atoms is preferably used.

Specific examples of the compound represented by Formula (1) are not particularly limited. The compound represented by Formula (1) is, for example, 2-(2-vinyloxyethoxy) ethyl (meth)acrylate and is preferably 2-(2-vinyloxyethoxy) ethyl acrylate (VEEA) is preferable.

In particular, the white ink preferably contains the vinyl group-containing (meth)acrylate, which is represented by Formula (1), as a polyfunctional polymerizable compound. This further enhances the curability of the white ink.

The content of the vinyl group-containing (meth)acrylate is preferably 1 mass % to 25 mass % with respect to the total mass of the polymerizable compound contained in the white ink, more preferably 2 mass % to 20 mass %, and further more preferably 3 mass % to 15 mass %. A fact that the content of the vinyl group-containing (meth)acrylate is in the above range suppresses the increase in viscosity of the white ink and provides ink with further enhanced ejection stability.

2.1.2.2. Polyfunctional (Meth)acrylate

The polyfunctional (meth)acrylate is not particularly limited. Examples of the polyfunctional (meth)acrylate include difunctional (meth)acrylates such as dipropylene glycol di(meth)acrylate, diethylene glycol di(meth)acrylate, and triethylene glycol di(meth)acrylate; tri- and higher functional (meth)acrylates such as trimethylolpropane tri(meth) acrylate, EO-modified trimethylolpropane tri(meth)acrylate, pentaerythritol tri(meth)acrylate, and pentaerythritol tetra (meth)acrylate; and the like.

Among these, dipropylene glycol di(meth)acrylate (DPGDA) is preferable. Using such a polyfunctional (meth) acrylate further enhances the curability and abrasion resistance of the white ink.

The content of the polyfunctional (meth)acrylate is preferably 1 mass % to 10 mass % with respect to the total mass of the polymerizable compound contained in the white ink, more preferably 2 mass % to 8 mass %, and further more preferably 3 mass % to 7 mass %. A fact that the content of the polyfunctional (meth)acrylate is in the above range further enhances the curability and abrasion resistance of the white ink.

The polymerizable compound functions as a solvent for inks. The type and content of the polymerizable compound are preferably determined in consideration of an SP value. Specifically, the SP value of ink can be determined in such a manner that the weighted average of the SP values of polymerizable compounds contained in the ink is calculated. Therefore, the types of polymerizable compounds contained in ink are selected and the contents thereof are determined such that the SP value of the ink is close to the SP value of the recording medium 6, thereby allowing the ink to exhibit excellent adhesion to various types of substrates.

A method for calculating the weighted average of SP values is described.

Suppose that the weighted average of SP values is $SP_{All}$, the SP value of each polymerizable compound is $SP_N$, and the mass content of the polymerizable compound is $X_N$ (mass %). N is substituted by an integer in increasing order from 1 depending on types of polymerizable compounds contained in the white ink. For example, when three types of polymerizable compounds are used, $SP^1$, $SP_2$, and $SP_3$ develop. The SP value of each polymerizable compound can be calculated from the structure of the polymerizable compound using Small's equation and is available from a safety data sheet (SDS) or catalogue information. The weighted average $SP_{All}$ of SP values is the sum of the products of $SP_N$ calculated from each polymerizable compound and the content $X_N$. Thus, the following equation holds:

$$SP_{All} = \Sigma SP_N \times X_N \quad (2).$$

$SP_{All}$ is preferably 8.5 to 11.0, more preferably 9.0 to 10.5, and further more preferably 9.3 to 10.0. A fact that $SP_{All}$ is in the above range allows the SP value of a non-absorbent recording medium described below and the SP value of ink to be close to each other and allows the ink to exhibit excellent adhesion.

2.2. White Pigment

The white pigment, which is used in the white ink, is not particularly limited. Examples of the white pigment include white inorganic pigments such as titanium oxide, zinc oxide, zinc sulfide, antimony oxide, magnesium oxide, and zirconium oxide. In addition to the white inorganic pigments, white organic pigments such as white hollow resin microparticles and polymer particles can be used.

The above pigments may be used alone or in combination. In a case where the pigments are used, the average particle size thereof is preferably 300 nm or less and more preferably 50 nm to 250 nm. When the average particle size thereof is in the above range, reliability including the ejection stability and dispersion stability of the white ink is more excellent and an image with excellent quality can be formed. In the present specification, the average particle size of pigment particles is the value of $Dv_{50}$ measured by a dynamic light scattering method.

Pigment can be used in the form of a pigment dispersion and a dispersant can be used as required. The dispersant is not particularly limited and is, for example, a dispersant, such as a polymeric dispersant, commonly used to prepare a pigment dispersion. Specific examples thereof include those mainly containing one or more of polyoxyalkylene polyalkylene amines, vinylic polymers, vinylic copolymers, acrylic polymers, acrylic copolymers, polyesters, polyamides, polyimides, polyurethanes, amino polymers, silicon-containing polymers, sulfur-containing polymers, fluorine-containing polymers, and epoxy resins. The dispersant may be used alone or in combination with one or more dispersants.

Commercially available products of the polymeric dispersant include Ajisper® series of Ajinomoto Fine-Techno. Co. Inc., Solsperse® series 36000 of The Lubrizol Corporation, Disperbyk series of BYK Additives & Instruments Ltd., and DISPARLON® series of Kusumoto Chemicals, Ltd.

The content of the dispersant is preferably 0.1 mass % to 2.0 mass % with respect to the total mass of ink, more preferably 0.1 mass % to 1.0 mass %, and further more preferably 0.1 mass % to 0.5 mass %.

2.3. Inorganic Particles

The white ink contains the inorganic particles. This enables the cured film 72 containing hard inorganic particles to be formed when the cured film 72 of the white ink is formed on the recording medium 6. The inorganic particles play a role in protecting the cured film 72, thereby enabling the recorded material 7 which is excellent in abrasion resistance to be obtained.

The inorganic particles are not particularly limited as long as the inorganic particles are different from the white pigment. For example, inorganic oxides such as silica including colloidal silica, titanium oxide, zinc oxide, antimony oxide, magnesium oxide, aluminium oxide, and zinc oxide are preferably used. A mixture of these may be used.

Among the above, silica particles and alumina particles are preferable and the silica particles are more preferable. The silica particles impart excellent abrasion resistance to the cured film 72 without impairing the excellent adhesion of the cured film 72. That is, the cured film 72 contains 80 mass % or more of the monofunctional polymerizable compound with respect to the total weight of the polymerizable compound contained in the white ink and therefore has excellent adhesion. The silica particles have adequate hardness. The white ink contains a predetermined amount of the monofunctional polymerizable compound, pigment particles, and the silica particles, thereby enabling the abrasion resistance of the cured film 72 to be improved without impairing the excellent adhesion of the cured film 72 and enabling the cured film 72 which ensures both adhesion and abrasion resistance to be obtained.

Examples of the silica particles include particles of fumed silica synthesized by allowing silicon chloride, aluminium chloride, titanium chloride, or the like to react with oxygen and hydrogen in a vapor phase by a fumed method; particles of silica synthesized by hydrolytically condensing a metal alkoxide by a sol-gel method; particles of colloidal silica synthesized by an inorganic colloid method; and the like. One or more of these can be used. Among these, colloidal silica is preferable. Such colloidal silica used may be a commercially available product. Examples of the commercially available product include Quartron® PL-1-1PA and PL-2L-MEK produced by Fuso Chemical Co., Ltd.; Organosilica Sol MA-ST-L, IPA-ST-L, and IPA-ST-ZL produced by Nissan Chemical Industries, Ltd; and the like.

The alumina particles may be those having any of a bar shape, a rosary shape, and a spherical shape. Spherical colloidal alumina is preferably used.

The inorganic particles, which are contained in the white ink, are made of material different from the above-mentioned white pigment. For example, when the white pigment is titanium oxide, the inorganic particles are made of material other than titanium oxide. A fact that the inorganic particles are those made of material different from the white pigment allows the whiteness of the white ink to be excellent and enables ink which is excellent in ejection stability to be obtained.

The content of the inorganic particles in the white ink is preferably 5 mass % to 40 mass % with respect to the total mass of the white ink and more preferably 10 mass % to 30 mass %.

Setting the content of the inorganic particles in the above range enables an effect due to a fact that the white ink contains the white pigment and the inorganic particles to be more clearly exhibited. That is, the recorded material 7 which is excellent in abrasion resistance can be obtained in such a manner that the cured film 72 is formed on the recording medium 6 so as to contain the inorganic particles, which are hard particles. Furthermore, the excessive increase in viscosity of ink can be suppressed and the white ink can be stably ejected from an ink jet head.

The average particle size of the inorganic particles is not particularly limited, is preferably 10 nm to 200 nm, is more preferably 25 nm to 150 nm, and is further more preferably 25 nm to 120 nm. A fact that the average particle size of the inorganic particles is in the above range allows an effect of the present disclosure that a recorded material which is excellent in adhesion and abrasion resistance can be obtained to be more clearly exhibited.

In the present specification, the average particle size of the inorganic particles means the particle size of particles in the inorganic particles at a cumulative percentage of 50% in a volume-based particle size distribution as determined by a laser diffraction-scattering method. The average particle size is measured by a dynamic light scattering method or laser diffraction light scattering method described in JIS Z 8825. Specifically, a particle size distribution analyzer in which the dynamic light scattering method is used as a measurement principle, for example, "Microtrac UPA" manufactured by Nikkiso Co., Ltd. can be used.

The shape of the inorganic particles may be, for example, any of a spherical shape, a bar shape, a rosary shape in which spherical particles are connected in series, a needle shape, and the like. Among these, the spherical shape or the bar shape is preferable and the spherical shape is particularly preferable from a viewpoint that a function as a spacer is effectively exhibited.

The shape of the inorganic particles can be identified by observation with a scanning electron microscope. In the present disclosure, the term "spherical shape" means that a case where a rosary shape in which spherical particles are connected in series, a bar shape, a needle shape, or the like is observed with a scanning electron microscope is excluded and is not limited to any perfect sphere or oval sphere.

2.4. Photopolymerization Initiator

A photopolymerization initiator is not particularly limited as long as the photopolymerization initiator is one that produces active species when being irradiated with radiation. Examples of the photopolymerization initiator include known photopolymerization initiators such as an acylphosphine oxide photopolymerization initiator, an alkylphenone photopolymerization initiator, a titanocene photopolymerization initiator, and a thioxanthone photopolymerization initiator. Among these, the acylphosphine oxide photopolymerization initiator is preferable. Using such a photopolymerization initiator further enhances the curability of the white ink and particularly curability by a curing process using light from a UV-LED. The photopolymerization initiator may be used alone or in combination with one or more photopolymerization initiators.

The acylphosphine oxide photopolymerization initiator is not particularly limited. Examples of the acylphosphine oxide photopolymerization initiator include 2,4,6-trimethylbenzoyldiphenylphosphine oxide, bis(2,4,6-trimethylbenzoyl)phenylphosphine oxide, bis(2,6-dimethoxybenzoyl)-2,4,4-trimethylpentylphosphine oxide, and the like.

Examples of a commercially available product of the acylphosphine oxide photopolymerization initiator include IRGACURE® 819 (bis(2,4,6-trimethylbenzoyl)phenylphosphine oxide), IRGACURE® 1800 (a mixture of bis(2,6-dimethoxybenzoyl)-2,4,4-trimethylpentylphosphine oxide and 1-hydroxycyclohexyl phenyl ketone mixed at a mass ratio of 25:75), and IRGACURE® TPO (2,4,6-trimethylbenzoyldiphenylphosphine oxide) produced by BASF AG.

The content of the photopolymerization initiator is preferably 3.0 mass % to 15.0 mass % with respect to the total mass of the white ink, more preferably 5.0 mass % to 13.5 mass %, and further more preferably 8.0 mass % to 12.0 mass %. A fact that the content of the photopolymerization initiator is in the above range further enhances the curability of the white ink and the solubility of the photopolymerization initiator.

2.5. Polymerization Inhibitor

A polymerization inhibitor is not particularly limited. Examples of the polymerization inhibitor include p-methoxy phenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), hindered amine compounds, and the like. The polymerization inhibitor may be used alone or in combination with one or more polymerization inhibitors.

The content of the polymerization inhibitor is preferably 0.05 mass % to 1.00 mass % with respect to the total mass of the white ink and more preferably 0.05 mass % to 0.50 mass %.

2.6. Surfactant

A surfactant is preferably a silicone surfactant and is more preferably polyester-modified silicone or polyether-modified silicone. Examples of the polyester-modified silicone include BYK®-347, BYK®-348, BYK®-UV3500, BYK®-UV3510, BYK®-UV3530, and the like produced by BYK Chemie GmbH. Examples of the polyether-modified silicone include BYK®-3570 and the like produced by BYK Chemie GmbH. The surfactant may be used alone or in combination with one or more surfactants.

The content of the surfactant is preferably 0.01 mass % to 2.00 mass % with respect to the total mass of the white ink and more preferably 0.05 mass % to 1.00 mass %.

2.7. Other Contained Components

The white ink may contain a dissolution aid, a viscosity modifier, a pH adjustor, an oxidation inhibitor, a preservative, a fungicide, rust preventive, and a humectant which is not any organic solvent for a purpose of maintaining storage stability and the ejection stability of an ink jet head good, a purpose of improving clogging, or a purpose of preventing the deterioration of ink and may appropriately contain various additives for a purpose of capturing metal ions which affect dispersion.

3. Ink Set

The ink set includes a non-white ink and the white ink. The non-white ink contains a non-white colorant and a polymerizable compound. The white ink is the "radiation-curable ink jet composition", which has been already described, and contains the polymerizable compound, the white pigment, and the inorganic particles, which are different from the white pigment. The white ink contains the monofunctional polymerizable compound as a polymerizable compound. The content of the monofunctional polymerizable compound is 80 mass % or more with respect to the total mass of the polymerizable compound contained in the white ink.

3.1. Non-White Ink

The non-white ink contains the non-white colorant and the polymerizable compound. The non-white ink contains a colorant which is not white as a colorant. The polymerizable compound may be the same as or different from that contained in the white ink. The non-white ink may contain at least one of a white colorant and inorganic particles as any component.

The non-white ink is described below. What is different from the white ink is described and what is common to the white ink is not described.

3.1.1. Non-White Colorant

The non-white ink contains the non-white colorant, that is, a color colorant or a black colorant. The non-white colorant used may be at least one of pigment and dye.

Using pigment as a colorant enables the lightfastness of the non-white ink to be enhanced. The pigment used may be either of an inorganic pigment and an organic pigment.

Examples of the inorganic pigment include carbon blacks (C. I. (Colour Index Generic Name) Pigment Black 7) such as furnace black, lamp black, acetylene black, and channel black; iron oxide; and the like.

Examples of the organic pigment include azo pigments such as insoluble azo pigments, condensed azo pigments, azo lakes, and chelated azo pigments; polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments; dye chelates (for example, basic dye chelates, and acidic dye chelates, and the like); dyeing lakes (basic dye lakes and acidic dye lakes); nitro pigments; nitroso pigments; aniline black; daylight fluorescent pigments; and the like.

More specifically, examples of pigment used in a yellow ink include C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180 and the like.

Examples of pigment used in a magenta ink include C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; C. I. Pigment Violets 19, 23, 32, 33, 36, 38, 43, and 50; and the like.

Examples of pigment used in a cyan ink include C. I. Pigment Blues 1, 2, 3, 15, 15:1, 15:2, 15:3, 15:34, 15:4, 16, 18, 22, 25, 60, 65, and 66; C. I. Vat Blues 4 and 60; and the like.

Examples of pigment other than magenta, cyan, and yellow pigments include C. I. Pigment Greens 7 and 10; C. I. Pigment Browns 3, 5, 25, and 26; C. I. Pigment Oranges 1, 2, 5, 7, 13, 14, 15, 16, 24, 34, 36, 38, 40, 43, and 63; and the like.

Examples of pigment used in a black ink include products, such as No. 2300, No. 900, MCF88, No. 33, No. 40, No. 45, No. 52, MA7, MA8, MA100, and No. 2200B, produced by Mitsubishi Chemical Corporation; products, such as Raven® 5750, Raven® 5250, Raven® 5000, Raven® 3500, Raven® 1255, Raven® 700, Regal 400R, Regal 330R, and Regal 660R, produced by Columbian Carbon Company; products, such as Mogul® L, Monarch® 700, Monarch® 800, Monarch® 880, Monarch® 900, Monarch® 1000, Monarch® 1100, Monarch® 1300, and Monarch® 1400, produced by Cabot Corporation; products, such as Color Black FW1, Color Black FW2, Color Black FW2V, Color Black FW 18, Color Black FW200, Color Black 5150, Color Black 5160, Color Black 5170, Printex 35, Printex U, Printex V, Printex 140U, Special Black 6, Special Black 5, Special Black 4A, and Special Black 4, produced by Degussa AG; and the like.

When dye is used as a colorant, the due is not particularly limited and an acidic dye, a direct dye, a reactive dye, a basic dye, and the like can be used. Examples of the dye include C. I. Acid Yellows 17, 23, 42, 44, 79, and 142; C. I. Acid Reds 52, 80, 82, 249, 254, and 289; C. I. Acid Blues 9, 45, and 249; C. I. Acid Blacks 1, 2, 24, and 94; C. I. Food Blacks 1 and 2; C. I. Direct Yellows 1, 12, 24, 33, 50, 55, 58, 86, 132, 142, 144, and 173; C. I. Direct Reds 1, 4, 9, 80, 81, 225, and 227; C. I. Direct Blues 1, 2, 15, 71, 86, 87, 98, 165, 199, and 202; C. I. Direct Blacks 19, 38, 51, 71, 154, 168, 171, and 195; C. I. Reactive Reds 14, 32, 55, 79, and 249; C. I. Reactive Blacks 3, 4, and 35; and the like.

The dye may be used alone or in combination with one or more dyes.

The content of a colorant in the non-white ink is preferably 0.2 mass % to 20.0 mass % with respect to the total mass of ink, more preferably 0.5 mass % to 15.0 mass %, and further more preferably 1.0 mass % to 10.0 mass %.

3.1.2. Monofunctional Polymerizable Compound

The content of the monofunctional polymerizable compound in the non-white ink is preferably 80 mass % or more with respect to the total mass of the polymerizable compound contained in the non-white ink, more preferably 85 mass % or more, and further more preferably 90 mass % or more. The content of the monofunctional polymerizable compound is preferably 99 mass % or less and more preferably 98 mass % or less. A fact that the content of the monofunctional polymerizable compound is 80 mass % or more enables the flexibility of the cured film 71 of the non-white ink to be increased. This further enhances the adhesion of the cured film 72 of the non-white ink to the recording medium 6.

The monofunctional polymerizable compound is not particularly limited. Examples of the monofunctional polymerizable compound include an alicyclic group-containing monofunctional polymerizable compound, an aromatic group-containing monofunctional polymerizable compound, a nitrogen-containing heterocyclic group-containing monofunctional polymerizable compound, and the like.

4. Recording Apparatus

A recording apparatus used in a method for manufacturing a recorded material is described with reference to FIG. 1. A recording apparatus 1 includes a first ink jet head 2 that ejects the non-white ink, a second ink jet head 3 that ejects the white ink, and a transport mechanism 5 for the recording medium 6.

Figure 1:
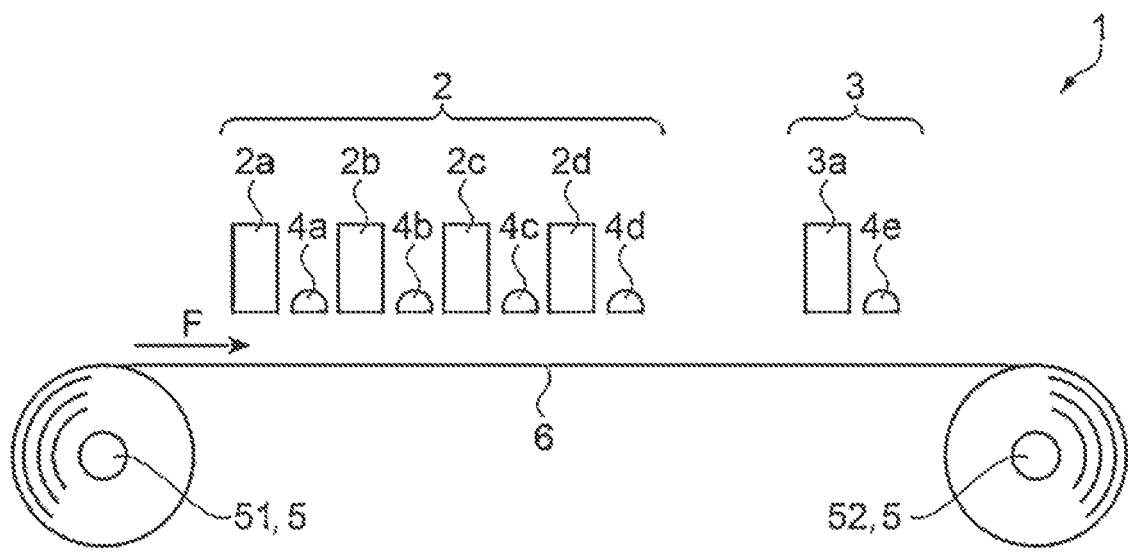
FIG. 1 is a schematic view of a recording apparatus that can be used in this embodiment.

The first ink jet head 2 may include first ink jet subheads 2a to 2d for each type of ink as shown in FIG. 1. Radiation sources 4a to 4d for curing the non-white ink applied to the recording medium 6 are arranged downstream of the first ink jet subheads 2a to 2d in a transport direction F.

Herein, the first ink jet subheads 2a to 2d and the radiation sources 4a to 4d are alternately arranged along the transport direction F of the recording medium 6. Such an arrangement enables that the non-white ink ejected from the first ink jet subhead 2a and applied to the recording medium 6 is irradiated with radiation from the radiation source 4a and is cured before the non-white ink ejected from the first ink jet subheads 2b to 2d arranged downstream of the transport direction F or the white ink ejected from a second ink jet subhead 3a is applied to the recording medium 6. This enables the occurrence of color bleeding to be suppressed when each of non-white inks of different colors is ejected from a corresponding one of the first ink jet subheads 2a to 2d.

The second ink jet head 3 includes the second ink jet subhead 3a for applying, for example, the white ink and a radiation source 4e, located downstream of the second ink jet subhead 3a, for curing the white ink applied to the recording medium 6.

The transport mechanism 5 for the recording medium 6 includes, for example, a feed roller 51 and a winding roller 52 and can form a roll in such a manner that the recording medium 6 is fed from the feed roller 51 in the transport direction F and is wound to the winding roller 52 after recording.

Examples of the first and second ink jet heads 2 and 3 include line heads that perform recording with a line system and serial heads that perform recording with a serial system.

In a line system in which a line head is used, for example, the first ink jet head 2 and the second ink jet head 3 are fixed to the recording apparatus 1. The first ink jet head 2 and the second ink jet head 3 are line ink jet heads in which nozzles that eject ink are arranged so as to cover a direction which crosses the transport direction F of the recording medium 6 and which crosses a print region of the recording medium 6. The recording medium 6 is moved in the transport direction F and the non-white ink and the white ink (hereinafter, the non-white ink and the white ink are collectively referred to as "ink" in some cases) are ejected from nozzles of the first ink jet head 2 and the second ink jet head 3 in association with this movement, whereby an image is recorded on the recording medium 6.

In a serial system in which a serial head is used, the first ink jet head 2 and the second ink jet head 3 are mounted on, for example, a carriage that can be moved in a thickness direction of the recording medium 6. The carriage is moved in a main scan direction (a lateral direction or width direction of the recording medium 6) and ink is ejected from nozzles of the first ink jet head 2 and the second ink jet head 3 in association with this movement, whereby an image is recorded on the recording medium 6.

Among these, the line system is preferably used from a viewpoint of winding the recording medium 6 provided with ink. In the case of the line system, recording with the line head and irradiation with radiation from the radiation sources 4a to 4e are performed with the recording medium 6 continuously fed and the recording medium 6 provided with ink can be wound downstream. Using the line system enables the recorded material 7 to be manufactured with high efficiency. A system of the recording apparatus 1 is the line system as shown in FIG. 1.

Examples of radiation include ultraviolet rays, infrared rays, visible rays, X-rays, and the like. The radiation sources 4a to 4e are not particularly limited and are, for example, UV-LEDs. Using the radiation sources 4a to 4e enables the downsizing of apparatuses and the reduction of costs. A UV-LED serving as a radiation source is compact and therefore can be attached to the recording apparatus 1.

5. Recording Medium

The recording medium 6 can be used without particular limitations even if the recording surface 61 is an absorbent recording medium having ink absorbency or a non-absorbent recording medium having no ink absorbency. The recording medium 6 is preferably a non-absorbent recording medium. In particular, the recording medium 6, which is used in this embodiment, is preferably such that both the recording surface 61 and the non-recording surface 62 are non-absorbent recording media that absorb no ink.

Using the recording medium 6 enables a recorded material suitable for label applications and the like to be obtained.

In a case where the recording medium 6 of which the recording surface 61 and the non-recording surface 62 are both non-absorbent is used, when the recorded material 7 is stacked such that the recording surface 61 and the non-recording surface 62 face each other, the recording surface 61 and the non-recording surface 62 stick to each other, so that the cured film 71 or 72 is peeled off or a scratch remains in the cured film 71 or 72.

However, in the present disclosure, the white ink is applied to the recording medium 6 and the cured film 72 of the white ink is formed in a second ejection step and a second curing step, respectively, as described below. Since the cured film 72 of the white ink contains the white pigment and the inorganic particles, which are hard particles, the remaining of a scratch in the cured film 71 or 72 or the peeling of the cured film 71 or 72 can be suppressed even when the recording surface 61 provided with ink and the non-recording surface 62 are stacked so as to face each other and are stored.

The non-absorbent recording medium is not particularly limited. Examples of the non-absorbent recording medium include films or plates of plastics such as polyvinyl chloride, polyethylene, polypropylene, polyethylene terephthalate (PET), polycarbonate, polystyrene, and polyurethane; plates of metals such as iron, silver, copper, and aluminium; metal plates manufactured by vapor-depositing the metals; plastic films; plates of alloys such as stainless steel and brass; recording media made by joining (coating) films of plastics such as polyvinyl chloride, polyethylene, polypropylene, polyethylene terephthalate (PET), polycarbonate, polystyrene, and polyurethane to substrates made of paper; and the like.

In this embodiment, the term "non-absorbent" means that the amount of absorbed water is 10 mL/m$^2$ or less in 30 msec from the start of contact in the Bristow method. The term "non-absorbent recording medium" refers to a recording medium having no absorbency. The Bristow method is the most popular method for measuring the amount of absorbed liquid in a short time and has been adopted by Japan Technical Association of the Pulp and Paper Industry (JAPAN TAPPI). Details of the Bristow method are described in Standard No. 51 "Paper and paperboard-liquid absorption test method-Bristow method" in "JAPAN TAPPI Pulp and Paper Test Methods, 2000".

The recording medium 6 is preferably a transparent substrate. Using the transparent substrate as the recording medium 6 enables an image formed using the non-white ink to be viewed from the non-recording surface 62 side of the recording medium 6. Furthermore, the cured film 72 of the white ink forms a background of the image formed using the non-white ink to block light passing through the transparent substrate. Therefore, the recorded material 7 which is excellent in visibility can be obtained.

In particular, in the present disclosure, it has been confirmed that a fact that the white ink contains the inorganic particles enhances the whiteness of the white ink. In the present disclosure, the cured film 72 of the white ink clearly exhibits an effect of blocking light passing through the transparent substrate, thereby enhancing the visibility of an image formed using the non-white ink further.

Herein, the transparent substrate is not particularly limited as long as the transparent substrate has such transparency that an image recorded on a surface thereof can be viewed from an opposite surface and the shape, structure, average thickness, and material thereof can be selected depending on purposes.

In the present disclosure, transparency means a property defined as the degree of haze measured in accordance with ASTM D 1003 or ISO 14782. The degree of haze is preferably 30% or less and more preferably 10% or less.

A method for measuring the degree of haze is not particularly limited and may be appropriately selected depending on purposes. For example, a hazemeter (tradename: HZ-V3, manufactured by Suga Test Instruments Co., Ltd.) and the like are cited.

Examples of a formation material that forms the transparent substrate include polyester resins such as polyethylene terephthalate, polyamide resins such as Nylon® and aramid, polyolefin resins such as polyethylene and polypropylene, polycarbonate resins, polystyrene resins, polyacetal resins, and the like. Among these formation materials, any of polyethylene terephthalate, a polyolefin, and Nylon® is preferably contained from a viewpoint of versatility and availability.

6. Method for Manufacturing Recorded Material

A method for manufacturing the recorded material 7 is a method for manufacturing the recorded material 7 using the above ink set and includes a first ejection step of ejecting the non-white ink to apply the non-white ink to the recording medium 6, a first curing step of irradiating the non-white ink applied to the recording medium 6 with radiation to obtain the cured film 71 of the non-white ink, a second ejection step of ejecting the white ink to apply the white ink to the cured film 71 of the non-white ink, and a second curing step of irradiating the white ink applied to the recording medium 6 with radiation to cure the white ink such that the recorded material 7 is obtained.

Herein, the white ink contains the polymerizable compound, the white pigment, and the inorganic particles, which are different from the white pigment. The white ink contains the monofunctional polymerizable compound as a polymerizable compound. The content of the monofunctional polymerizable compound is 80 mass % or more with respect to the total mass of the polymerizable compound contained in the white ink.

This enables the recorded material 7 which is excellent in adhesion and abrasion resistance to be obtained. Specifically, since the white ink, which forms the cured film 72, contains 80 mass % or more of the monofunctional polymerizable compound with respect to the total mass of the polymerizable compound, the cured film 72 of the white ink has high flexibility. Therefore, the cured film 72 of the white ink has high followability to the recording medium 6 and the recorded material 7 which is excellent in adhesion can be obtained. Furthermore, the white ink contains hard particles, that is, the white pigment and the inorganic particles. The hard particles protect the cured film 72 and therefore the recorded material 7 which is excellent in abrasion resistance can be obtained.

6.1. First Ejection Step

The first ejection step is a step of ejecting the non-white ink from the first ink jet head 2 to apply the non-white ink to the recording medium 6. More specifically, the non-white ink held in a pressure-generating chamber of the first ink jet head 2 is ejected from a nozzle by driving a pressure-generating unit.

In this embodiment, the non-white ink is one of a plurality of non-white inks which contain different types of colorants and is ejected from the first ink jet subheads 2a to 2d. The first ink jet subheads 2a to 2d may eject one type of non-white ink only or may eject two or more types of non-white inks.

In the first ejection step, ejection modes such as duty of the non-white ink are not particularly limited and may be appropriately adjusted depending on an image that is intended.

6.2. First Curing Step

The first curing step is a step of irradiating the non-white ink applied to the recording medium 6 with radiation from the radiation sources 4a to 4d to obtain the cured film 71 of the non-white ink. When radiation is applied, a polymerization reaction of the polymerizable compound starts to cure the non-white ink, whereby the cured film 71 is formed. In this situation, when the photopolymerization initiator is present in the non-white ink, active species (initiation species) such as radicals, acids, and bases are generated and the polymerization reaction of the polymerizable compound is promoted by a function of the initiation species.

6.3. Second Ejection Step

The second ejection step is a step of ejecting the white ink, which contains the polymerizable compound, from the second ink jet head 3 to apply the white ink to the cured film 71 of the non-white ink. The white ink is applied to the cured film 71 of the non-white ink applied to the recording medium 6. The white ink may be applied to a region of the recording medium 6 that is not provided with the cured film 71 of the non-white ink.

6.4. Second Curing Step

The second curing step is a step of irradiating the white ink applied to the recording medium 6 with radiation from the radiation source 4e to cure the white ink such that the recorded material 7 is obtained. This enables the white ink applied to the recording medium 6 to be cured.

In order to sufficiently cure the non-white ink and the white ink, the recording apparatus 1 may further include a radiation source, which is not shown, separately from the radiation sources 4a to 4e.

The white ink contains the monofunctional polymerizable compound and the content of the monofunctional polymerizable compound is 80 mass % or more with respect to the total mass of the polymerizable compound contained in the white ink. This enables the cured film 72 which is excellent in adhesion to be obtained. The white ink contains the white pigment and the inorganic particles, which are hard particles. The hard particles play a role in protecting the cured film 72, thereby allowing the cured film 72 to have excellent abrasion resistance. That is, according to a method for manufacturing a recorded material of the present disclosure, a recorded material which is excellent in adhesion and abrasion resistance can be obtained.

6.5. Layering Step

The method for manufacturing the recorded material 7 may include a layering step. The layering step is a step of stacking the recorded material 7 such that the recording surface 61 and the non-recording surface 62 face each other.

In the layering step, a stacking method is not particularly limited. Examples of the stacking method include a method in which the recorded material 7 in the form of a single sheet is stacked one by one such that the recording surface 61 and the non-recording surface 62 face each other, a method in which the recording surface 61 and the non-recording surface 62 are stacked so as to face each other in such a manner that the recorded material 7 obtained by continuously performing recording on the elongated recording medium 6 is wound into a roll form downstream of the recording apparatus 1, and the like.

This enables the recorded material 7 finished in manufacture to be efficiently housed and stored in a small space. The recorded material 7 includes the cured film 72 of the white ink that is excellent in adhesion and abrasion resistance. Therefore, even when the recording surface 61 and the non-recording surface 62 are stacked so as to face each other and are stored, the remaining of a scratch in the cured film 71 or 72 or the peeling of the cured film 71 or 72 can be suppressed.

In the layering step, the stacking method is preferably the method in which the recording surface 61 and the non-recording surface 62 are stacked so as to face each other in such a manner that the recorded material 7 obtained by continuously performing recording on the elongated recording medium 6 is wound into a roll form downstream of the recording apparatus 1. Specifically, the recording medium 6 is wound to the winding roller 52, thereby enabling the recorded material 7 to be transformed into a roll. In this roll, the recording surface 61 and the non-recording surface 62 are stacked so as to face each other and the recorded material 7 is coiled.

Storing the recorded material 7 in the form of a roll enables a storage space for the recorded material 7 to be efficiently used. Winding the recording medium 6 provided with ink and irradiated with radiation on a downstream enables a roll of the recorded material 7 to be efficiently obtained.

On the other hand, when the recorded material 7 is wound into a roll form, the recording surface 61 and the non-recording surface 62 are strongly pressed against each other because the recording surface 61 and the non-recording surface 62 are wound into a roll form so as to face each other. However, the recorded material 7 includes the cured film 72 of the white ink that is excellent in adhesion and abrasion resistance. Therefore, when the recorded material 7 is wound into a roll form such that the recording surface 61 and the non-recording surface 62 face each other, the remaining of a scratch in the cured film 71 or 72 or the peeling of the cured film 71 or 72 because of the sticking of the recording surface 61 and the non-recording surface 62 can be suppressed. That is, in a R-to-R (roll-to-roll) printing apparatus, the method for manufacturing the recorded material of the present disclosure is effective in performing printing on the filmy recording medium 6 and winding the filmy recording medium 6.

After the cured film 71 of the non-white ink, which is a non-white ink, is formed on the recording medium 6, the cured film 72 of the white ink is formed. Since the cured film 72 contains the white pigment and the inorganic particles, which are hard particles, the remaining of a scratch in the cured film 71 or 72 or the peeling of the cured film 71 or 72 can be suppressed even when the recorded material 7 is stacked such that the recording surface 61 and the non-recording surface 62 face each other.

As used in this embodiment, the recording medium 6 may be a filmy recording medium as shown in FIG. 1 and the recorded material 7 may be a roll wound to the winding roller 52. Storing the recorded material 7 in the form of a roll enables a storage space for the recorded material 7 to be efficiently used.

On the other hand, although transforming the recorded material 7 into a roll brings the recording surface 61 and non-recording surface 62 of the recorded material 7 into contact with each other, the cured film 72 is protected by the white pigment and the inorganic particles because the cured film 72 of the white ink contains the white pigment and the inorganic particles, which are hard particles, thereby enabling the recorded material 7 which is excellent in adhesion and abrasion resistance to be obtained.

In a case where the recorded material 7 is used for labels and the like, when the recorded material 7 is unwound from a roll, the peeling of the cured film 71 or 72 or the remaining of a scratch in the cured film 71 or 72 can be suppressed. That is, even in a case where the recorded material 7 is wound to the winding roller 52 and is stored in the form of a roll, the present disclosure is particularly useful from a viewpoint that the sticking of the recording surface 61 and non-recording surface 62 of the recorded material 7 is suppressed and the peeling of the cured film 71 or 72 or the remaining of a scratch in the cured film 71 or 72 is suppressed.

In particular, when a large amount of the monofunctional polymerizable compound is contained from a viewpoint of enhancing the adhesion of the cured film 72, which is formed from the white ink, to the recording medium 6, the recording surface 61 and the non-recording surface 62 are likely to stick together and the abrasion resistance of the cured film 71 tends to be impaired. However, the recorded material 7 of this embodiment is such that the recording surface 61 and the non-recording surface 62 are excellent in adhesion and abrasion resistance and the peeling of the cured film 71 or 72 or the remaining of a scratch in the cured film 71 or 72 can be suppressed because the cured film 72 of the white ink contains the white pigment and the inorganic particles, which are hard particles.

7. Examples

The present disclosure is described below in detail using examples and comparative examples. The present disclosure is not in any way limited by the examples below.

7.1. Preparation of Ink Compositions

A colorant, a dispersant, and portions of polymerizable compounds were weighed, were put into a tank for dispersing pigments, and were stirred together with ceramic beads with a diameter of 1 mm, whereby a pigment dispersion containing the polymerizable compounds and the colorant dispersed therein was obtained.

Next, the residual polymerizable compounds, a photopolymerization initiator, a polymerization inhibitor, and a surfactant were put into a mixing tank which was a stainless steel tank so as to give a composition described in Table 1 and were completely dissolved by stirring and mixing, followed by charging the pigment dispersion obtained as described above into the mixing tank and then stirring and mixing at room temperature for one hour. Thereafter, filtration was performed using a 5 μm membrane filter, whereby non-white inks and white inks of examples and comparative examples were obtained. Values of components shown in examples and comparative examples in Table 1 are in mass %.

TABLE 1

|  |  |  | SP value Small | White ink 1 | 2 | 3 | 4 | 5 | 6 | 7 | Non-white ink 1 |
|---|---|---|---|---|---|---|---|---|---|---|---|
|  | Colorant | Titanium oxide |  | 15.0 | 15.0 | 15.0 | 15.0 | 15.0 | 15.0 | 15.0 | — |
|  |  | Carbon black |  | — | — | — | — | — | — | — | 3.0 |
|  | Dispersant | Solsperse 36000 |  | 1.0 | 1.0 | 1.0 | 1.0 | 1.0 | 1.0 | 1.0 | 1.0 |
| Polymerizable compound | Monofunctional polymerizable compound | IBXA | 7.25 | 20.0 | 27.0 | 20.0 | 20.0 | 20.0 | 20.0 | 10.0 | 27.0 |
|  |  | PEA | 9.99 | 19.3 | 22.3 | 19.3 | 16.3 | 29.3 | 24.3 | 19.3 | 33.3 |
|  |  | ACMO | 11.55 | 14.0 | 14.0 | 14.0 | 14.0 | 14.0 | 14.0 | 24.0 | 15.0 |
|  | Polyfunctional polymerizable compound | VEEA | 9.41 | 12.0 | 2.0 | 12.0 | 15.0 | 12.0 | 12.0 | 12.0 | 12.0 |
|  | Inorganic particles | Silica |  | 10.0 | 10.0 | — | 10.0 | — | 5.0 | 10.0 | — |
|  |  | Alumina |  | — | — | 10.0 | — | — | — | — | — |
|  | Photopolymerization initiator | 819 |  | 2.5 | 2.5 | 2.5 | 2.5 | 2.5 | 2.5 | 2.5 | 2.5 |
|  |  | TPO |  | 5.5 | 5.5 | 5.5 | 5.5 | 5.5 | 5.5 | 5.5 | 5.5 |
|  | Polymerization initiator | MEHQ |  | 0.2 | 0.2 | 0.2 | 0.2 | 0.2 | 0.2 | 0.2 | 0.2 |
|  | Surfactant | BYK UV3500 |  | 0.5 | 0.5 | 0.5 | 0.5 | 0.5 | 0.5 | 0.5 | 0.5 |
|  | Sum |  |  | 84.0 | 84.0 | 84.0 | 84.0 | 84.0 | 84.0 | 84.0 | 96.0 |
|  | Content of monofunctional polymerizable compound with respect to total mass of polymerizable compounds (%) |  |  | 82 | 97 | 82 | 77 | 84 | 83 | 82 | 86 |
|  | SP value |  |  | 9.38 | 9.17 | 9.38 | 9.35 | 9.46 | 9.42 | 10.04 | 9.33 |

Materials listed in Table 1 are as described below.
Monofunctional Polymerizable Compound
  IBXA (Osaka Organic Chemical Industry Ltd., isobornyl acrylate)
  PEA (tradename "Viscoat #192", Osaka Organic Chemical Industry Ltd., phenoxyethyl acrylate)
  ACMO (KJ Chemicals Corporation, acryloyl morpholine)
Polyfunctional Polymerizable Compound
  VEEA (Nippon Shokubai Co., Ltd., 2-(2-vinyloxyethoxy) ethyl acrylate)

Photopolymerization Initiator
  819 (tradename "IRGACURE 819", BASF AG, bis(2,4,6-trimethylbenzoyl)phenylphosphine oxide)
  TPO (tradename "IRGACURE TPO", BASF AG, 2,4,6-trimethylbenzoyldiphenylphosphine oxide)
Polymerization Inhibitor
  MEHQ (tradename "p-methoxyphenol", Kanto Chemical Co., Inc., hydroquinone monomethyl ether)
Surfactant
  BYK-UV3500 (BYK Additives & Instruments Ltd., acryloyl group-containing polyether-modified silicone)
Colorant (Pigment)
  Carbon black (tradename "MA-100", produced by Mitsubishi Chemical Corporation, carbon black)
  Titanium oxide (tradename "CR-93", produced by Ishihara Sangyo Kaisha, Ltd., titanium oxide, an average particle size $Dv_{50}$ of 300 nm)
Dispersant
  Solsperse 36000 (The Lubrizol Corporation, polymeric dispersant)

In Table 1, "Content of monofunctional polymerizable compound with respect to total mass of polymerizable compounds" represents the ratio (mass %) of the content of a monofunctional polymerizable compound to the sum of the contents of the polymerizable compounds.

7.2. Evaluation Method
7.2.1. Evaluation of Adhesion

A printer (manufactured by Seiko Epson Corporation, a modification of PX-G5000) was used as a recording apparatus 1 and a recorded material was prepared on a polyvinyl chloride film using a combination of a white ink and non-white ink described in Table 1. In this operation, the non-white ink was used to form a 600 dpi×600 dpi solid image with a duty of 100% and the weight of ink per dot was adjusted such that the thickness of a cured film 71 was 10 μm. After the non-white ink was applied, the non-white ink was irradiated with an ultraviolet ray such that irradiation energy was 400 mJ/cm², whereby the cured film 71 was formed.

The white ink was applied to the cured film 71 of the non-white ink so as to overlap the cured film 71. Application conditions were such that a 600 dpi×600 dpi solid image with a duty of 100% was formed and the weight of ink per dot was adjusted such that the thickness of a cured film 72 was 10 μm. After the white ink was applied, the white ink was irradiated with an ultraviolet ray such that irradiation energy was 400 mJ/cm², whereby the recorded material was obtained.

The obtained cured films 71 and 72 were evaluated by a cross-cut test in accordance with JIS K 5600-5-6.

More specifically, cells with an inter-notch distance of 1 mm were formed in such a manner that a blade of a notching tool was applied perpendicularly to the cured films 71 and 72 using a cutter, whereby a grid composed of 10×10 cells. An about 75 mm long transparent adhesive tape (a width of 25 mm) was stuck to the grid and was sufficiently rubbed with a finger such that the cured films 71 and 72 were seen through. Next, within five minutes after the tape was stuck, the tape was reliably peeled from the cured films 71 and 72 at an angle close to 60° in 0.5 seconds to 1.0 second, followed by visually observing the state of the grid. Evaluation criteria are as described below.
Evaluation Criteria
  A: Less than 10% of a grid is found to be peeled off.
  B: 10% to less than 35% of a grid is found to be peeled off.
  C: 35% or more of a grid is found to be peeled off.

7.2.2. Evaluation of Abrasion Resistance

Cured films 71 and 72 prepared in the above "Evaluation of Adhesion" were evaluated by a micro scratch test in accordance with JIS R 3255. Load capacity as abrasion resistance was measured using an ultra-thin scratch tester (CSR-5000, manufactured by Nanotec Corporation). Load capacity was given as a load when a probe reached a surface of a medium in micro-scratching performed with a load applied. Measurement was performed with a probe stylus diameter of 15 μm at an amplitude of 100 μm and a scratching speed of 10 μm/s. Evaluation criteria are as described below.
Evaluation Criteria
  A: 30 mN/cm² or more
  B: 25 mN/cm² to less than 30 mN/cm²
  C: 20 mN/cm² to less than 25 mN/cm²
  D: less than 20 mN/cm²

TABLE 2

|  | Example | | | | | Comparative Example | |
| --- | --- | --- | --- | --- | --- | --- | --- |
|  | 1 | 2 | 3 | 4 | 5 | 1 | 2 |
| White ink | 1 | 2 | 3 | 6 | 7 | 5 | 4 |
| Non-white ink | 1 | 1 | 1 | 1 | 1 | 1 | 1 |
| Adhesion | A | A | B | A | B | B | C |
| Abrasion resistance | A | B | A | B | A | C | A |

7.3. Evaluation Results

Evaluation results are shown in Table 2. From a comparison between each example and Comparative Example 1, it is clear that a fact that a white ink contains a white pigment and inorganic particles enhances the adhesion and abrasion resistance of a recorded material, particularly the abrasion resistance of the recorded material. From a comparison between each example and Comparative Example 2, it can be confirmed that a fact that the content of a monofunctional polymerizable compound in a white ink is 80 mass % or more with respect to the total mass of polymerizable compounds contained in the white ink enhances the adhesion of cured films 71 and 72 to a recording medium 6.

What is claimed is:
1. A radiation-curable ink jet composition comprising:
    a polymerizable compound;
    a white pigment; and
    inorganic particles different from the white pigment, wherein
    the polymerizable compound includes a monofunctional polymerizable compound and the content of the monofunctional polymerizable compound is 80 mass % or more with respect to the total mass of the polymerizable compound contained in the radiation-curable ink jet composition.
2. The radiation-curable ink jet composition according to claim 1, wherein the inorganic particles are silica particles.
3. The radiation-curable ink jet composition according to claim 1, wherein the content of the inorganic particles is 10 mass % to 30 mass % with respect to the total mass of the radiation-curable ink jet composition.
4. An ink set comprising:
    a non-white ink containing a non-white colorant and a polymerizable compound; and
    a white ink, wherein
    the white ink is the radiation-curable ink jet composition according to claim 1.

5. The ink set according to claim 4, wherein the non-white ink contains the monofunctional polymerizable compound and the content of the monofunctional polymerizable compound is 80 mass % or more with respect to the total mass of the polymerizable compound contained in the non-white ink.

6. A method for manufacturing a recorded material using the ink set according to claim 4, comprising:
- a first ejection step of ejecting the non-white ink to apply the non-white ink to a recording medium;
- a first curing step of irradiating the non-white ink applied to the recording medium with radiation to obtain a cured film of the non-white ink;
- a second ejection step of ejecting the white ink to apply the white ink to the cured film of the non-white ink; and
- a second curing step of irradiating the white ink applied to the recording medium with radiation to cure the white ink such that a recorded material is obtained.

7. The method for manufacturing a recorded material according to claim 6, further comprising a layering step of layering the recorded material such that a recording surface provided with the non-white ink and the white ink and a non-recording surface provided with no non-white ink or white ink face each other.

8. The method for manufacturing a recorded material according to claim 7, wherein the layering step includes winding the recorded material into a roll form such that the recording surface and the non-recording surface face each other.

9. The method for manufacturing a recorded material according to claim 7, wherein the recorded material is such that both the recording surface and the non-recording surface are non-absorbent.

* * * * *